United States Patent
Murray et al.

[11] Patent Number: 6,099,209
[45] Date of Patent: Aug. 8, 2000

[54] CUTTING TOOL AND METHOD FOR PRODUCING AND CUTTING A NON-POROUS SURFACE LAYER

[75] Inventors: Gerald D. Murray, Latrobe; Edward J. Oles, Ligonier, both of Pa.

[73] Assignee: Kennametal Inc., Latrobe, Pa.

[21] Appl. No.: 09/130,576

[22] Filed: Aug. 7, 1998

[51] Int. Cl.$^7$ .................................................. B23P 15/28
[52] U.S. Cl. ........................... 407/1; 407/113; 407/118; 407/119
[58] Field of Search .................. 407/1, 113, 114, 407/115, 119, 120

[56] References Cited

U.S. PATENT DOCUMENTS

| | | | |
|---|---|---|---|
| 386,013 | 7/1888 | Howe | 407/1 |
| 3,745,623 | 7/1973 | Wentor | 407/119 |
| 4,294,565 | 10/1981 | Erkfritz | 407/113 |
| 4,297,058 | 10/1981 | Armbrust et al. | 407/113 |
| 4,552,492 | 11/1985 | Komanduri et al. | 407/114 |
| 4,561,810 | 12/1985 | Ohno | 407/114 |
| 4,597,695 | 7/1986 | Johnson | 407/113 |
| 4,702,649 | 10/1987 | Komanduri | 407/119 |
| 4,714,385 | 12/1987 | Komanduri | 407/119 |
| 4,854,784 | 8/1989 | Murray et al. | 407/114 |
| 4,990,036 | 2/1991 | Eklund et al. | 407/115 |
| 5,139,372 | 8/1992 | Tanabe et al. | 407/119 |
| 5,183,362 | 2/1993 | Kuroyama et al. | 407/119 |
| 5,209,611 | 5/1993 | Drescher | 407/114 |
| 5,443,334 | 8/1995 | Pantzar | 407/114 |
| 5,569,000 | 10/1996 | Littecke et al. | 407/114 |

FOREIGN PATENT DOCUMENTS

| | | |
|---|---|---|
| 136585 | 7/1979 | Germany . |
| 3520-371 | 3/1986 | Germany ........................... 407/114 |
| 1-321101 | 12/1989 | Japan . |
| 870-096 | 10/1981 | U.S.S.R. ................................ 407/1 |
| 1166-901 | 7/1985 | U.S.S.R. ................................ 407/1 |
| 1590-357 | 9/1990 | U.S.S.R. ................................ 407/1 |

*Primary Examiner*—Andrea L. Pitts
*Assistant Examiner*—Erica Ergenbright
*Attorney, Agent, or Firm*—Larry R. Meenan

[57] ABSTRACT

A cutting tool has a compressing segment for imparting a compressive force to produce a non-porous surface layer on a workpiece of porous material. The cutting tool also has a cutting segment to machine the non-porous surface layer for a desired surface finish. Furthermore, a method for machining a workpiece using such a cutting tool may be implemented to produce a non-porous surface layer on a workpiece of porous material and then to produce a desired surface finish.

21 Claims, 4 Drawing Sheets

CUTTING TOOL AND METHOD FOR PRODUCING AND CUTTING A NON-POROUS SURFACE LAYER

BACKGROUND OF THE INVENTION

1. Field of the Invention

The present invention generally relates to a cutting tool used in metalworking operations. More particularly, the present invention relates to a cutting tool for compressing a porous surface of a material to create a non-porous surface layer and thereafter removing a portion of the material to produce a desirable surface finish but to retain a portion of the non-porous layer.

Subsurface porosity exists in many materials, and the degree of such porosity is determined by the properties of the material itself and by the manner in which the material is fabricated (e.g., casting, powder densification, welding, etc.). For example, when two metallic parts must be mated to provide a seal for any fluids (e.g., gas or liquid) that may travel within the parts, it is very important for the subsurface porosity that is interconnected with the surface to be very low. However, there are instances in which this subsurface porosity is not low and, as a result, even though the parts may be properly mated, fluid escapes through or along the walls of the parts. Cast aluminum alloys are particularly susceptible to this problem. A tool is needed that is capable of sealing this subsurface porosity, at ambient and other temperatures, at least on the mating surface of the parts, and then, if necessary, machining this surface to obtain a desired surface finish while simultaneously retaining a layer of the non-porous surface.

A tool is therefore needed which is capable of sealing to a depth a part of or all of the surface of a workpiece having subsurface porosity and to then cut this surface to a lesser depth to provide a desired surface finish.

2. Description of the Prior Art

Japanese unexamined Published Patent Application No. 1-321101 teaches a cutting tool that is suited for cutting compound materials such as iron and aluminum in which the cutting tool has two cutting edges positioned along the length of one side of the tool whereby the first cutting edge is not honed but is sharp to cut the aluminum material, while the second following cutting edge is honed to cut the iron material. This design, however, does not address, nor does it provide a solution to the problem of materials having unacceptable levels of subsurface porosity.

SUMMARY OF THE INVENTION

The subject invention is directed toward a cutting tool for sealing the surface of a porous metal workpiece and for removing material from the workpiece along a direction of feed, wherein the cutting tool has a polygonal body of wear resistant material and comprises top and bottom surfaces and a peripheral wall therebetween and at least one corner region. The corner region is comprised of a compressing segment having a blunt edge for imparting a force which is predominantly compressive upon a portion of the workpiece and producing on that compressed portion a non-porous surface layer having a depth, and a cutting segment located in a direction opposite the direction of feed from the compressing segment for cutting the compressed portion to a depth less than that of the non-porous layer thereby retaining at least a portion of the non-porous surface layer. The cutting segment has an edge which protrudes at least to the blunt contact surface of the compressing segment, but preferably extends beyond the blunt edge to ensure removing at least a portion of the workpiece material.

The cutting tool may have a blunt edge on a compressing segment with a straight profile or a curved profile when viewed looking down on the top surface of the insert.

Additionally, the cutting tool may have a cutting edge on a cutting segment with a straight profile or a curved profile when viewed looking down on the top surface of the insert.

The subject invention is also directed to a method of machining a workpiece of porous material to produce a finished non-porous surface layer comprising the steps of compressing the surface of the workpiece to produce a non-porous surface layer having a depth and subsequently cutting the portion of the non-porous layer to remove a portion of that layer and to produce a desired surface finish on the workpiece.

Other objects and features of the invention will become apparent by reference to the following specification and to the drawings.

DETAILED DESCRIPTION OF THE INVENTION

Figure 1:
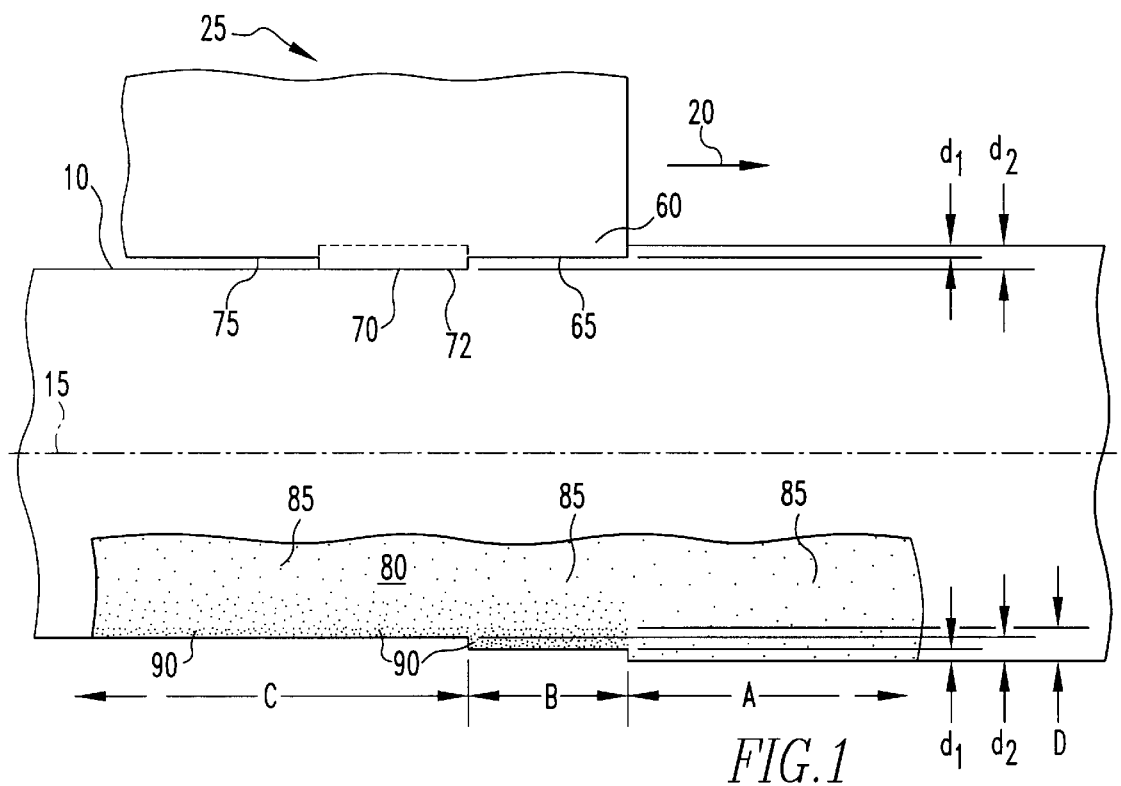
FIG. 1 is a simplified sketch illustrating the cutting tool of the subject invention with a portion cut away for illustrative purposes and a method of using the cutting tool.

FIG. 1 shows a typical application for machining in which a workpiece 10 is rotated about an axis 15 in a direction of feed shown by arrow 20 by a device such as a lathe. A cutting tool 25 may be securely held within a toolholder (not shown) to guide the cutting tool 25 against the workpiece 10.

Figure 2:
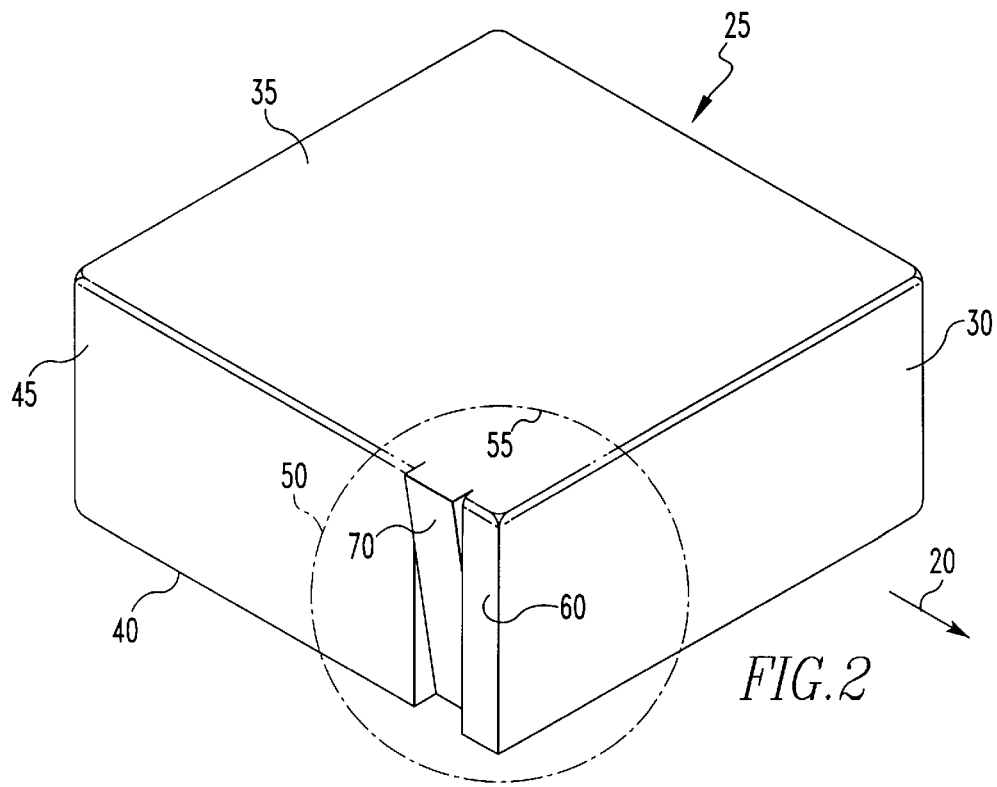
FIG. 2 is a first embodiment of a cutting tool in accordance with the present invention.
Figure 3:
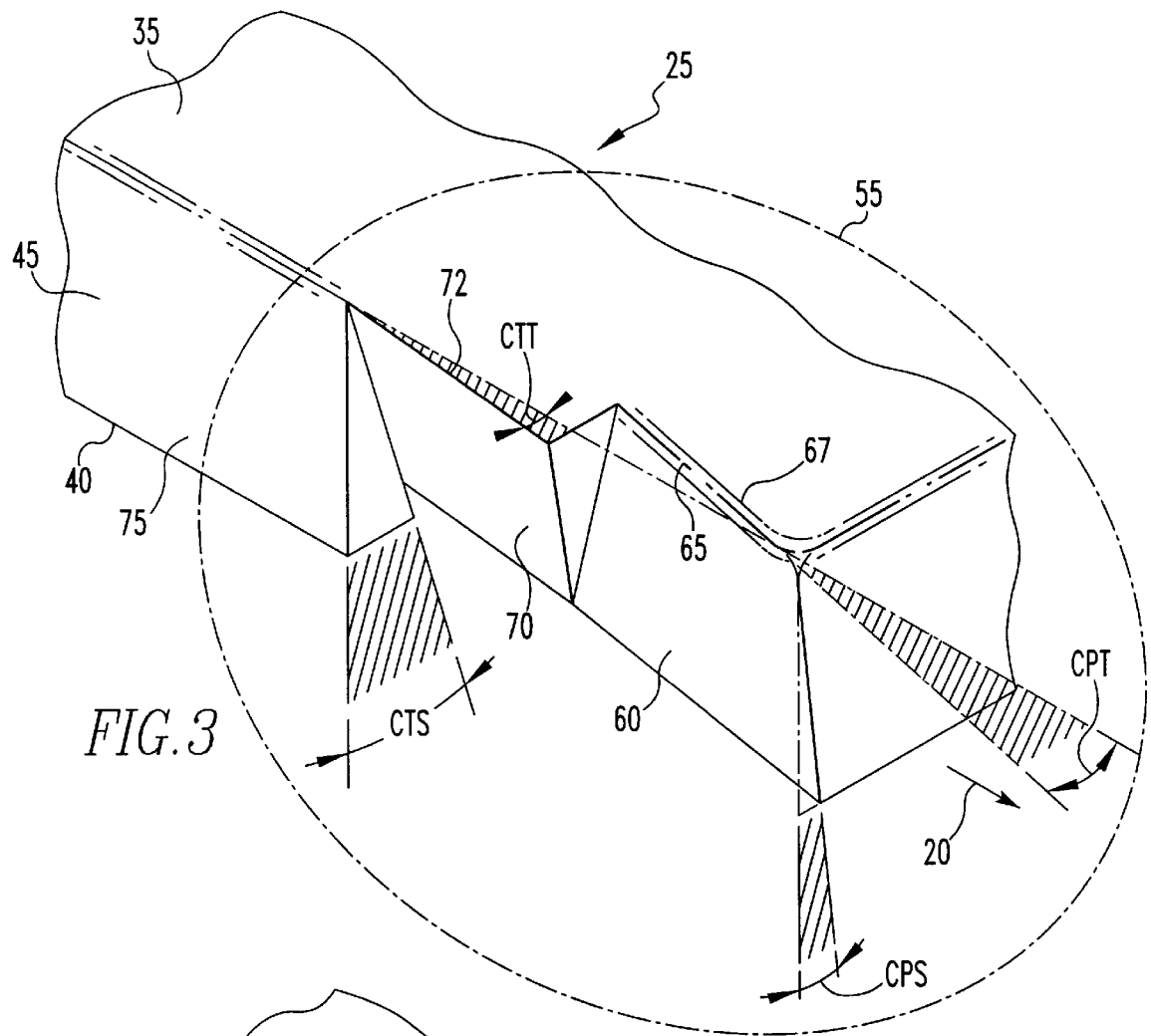
FIG. 3 shows an isometric view of a cutting tool corner portion in accordance with a first embodiment of the present invention.

One such cutting tool in accordance with a first embodiment of the subject invention is illustrated in FIGS. 1, 2 and 3. FIG. 1 shows a portion of the tool 25 illustrated in isometric view in FIG. 2. Certain features, such as clearance angles, have been left off the tool of FIGS. 1 and 2 to provide clarity in explaining these figures, but these features are included in FIG. 3. The cutting tool 25 is generally comprised of a polygonal body 30 having a top surface 35 and a bottom surface 40 with a peripheral wall 45 therebetween. A circle 50 illustrated in FIG. 2 highlights a corner region 55 of the tool which is shown in greater detail in FIG. 3, however, illustrated with a scale having different proportions. The corner region 55 is comprised of a compressing segment 60 having a blunt edge 65 and a cutting segment 70, with a cutting edge 72, preferably sharp, located in a direction behind the direction of feed from the compressing segment 60.

A clearance segment 75 is located in a direction opposite the direction of feed 20 from the cutting segment 70.

A typical workpiece 10 having subsurface porosity is illustrated in FIG. 1, and the subsurface porosity is generally indicated by a series of dots 80 which are generally spaced to be indicative of the density of the material shown in the cutaway portion. The surface in the cutaway portion is along a plane radial to axis 15 and parallel to the plane of the page. Such a material may, for example, be a cast aluminum alloy. For purposes of discussion, in the cutaway portion the relatively widely-spaced dots identified by category 85 illustrate high subsurface porosity, while the relatively densely-spaced dots identified by category 90 illustrate low subsurface porosity.

The inventors have discovered that by applying compressive forces to the outer surface of a material having high subsurface porosity, the outer layer may be compressed and the density of that layer increased, thereby lowering the subsurface porosity on and near the surface of the material. The amount of compression to which the surface is subjected is dependent upon the material and the level and depth to which the subsurface porosity must be reduced. However, the compression force must be sufficient to subject the surface of the material to plastic deformation to the desired depth.

Returning to FIG. 1, the blunt edge 65 of the compressing segment 60 is urged against the workpiece 10 to a depth d1 necessary to produce a layer of dense material having low subsurface porosity. For the purposes of this discussion, low subsurface porosity will be referred to as non-porous, with the understanding that such a term is subjective and defines only that level of subsurface porosity desired for a given situation. A relatively homogeneous density indicated by the widely-spaced dots of category 85 exists throughout the material prior to compression by the compressing segment 60. This is illustrated in segment A on FIG. 1. When the surface of the material is compressed, the density of the material proximate to the surface increases to produce a category 90 of densely-spaced dots. This is illustrated by segment B in FIG. 1. It should be noted that, due to the elasticity of material, there will be a gradient between the category 90 densely-spaced dots and the category 85 widely-spaced dots. This is significant because typically the compression process for generating a nonporous surface produces a poor surface finish and, as a result, the material must subsequently be machined for a more desirable surface finish. To accomplish this, the cutting segment 70 of the cutting tool 25 penetrates the workpiece 10 to a depth of cut d2. As an example, for a cast aluminum material, the compressing segment 60 may be urged against the workpiece 10 to a depth of d1 which may be 0.010 inch. Subsequently, the cutting segment 70 may penetrate the workpiece 10 to an additional depth of cut of approximately 0.002 to 0.003 inch so that d2 will be equal to approximately 0.012 to 0.013 inch. By doing so, the cutting segment 70 will remove a portion of the non-porous surface layer as illustrated in segment C of FIG. 1. It is important to note that the density of the material decreases with depth from the surface and, as a result, the desired porosity of the surface will be the porosity of the layer exposed by the cutting segment 70 and not the initial surface porosity produced by the compressing segment 60.

Therefore, the compressing segment 60 will impart a force which is predominantly compressive upon a portion of the workpiece and produce on that portion of the workpiece a non-porous surface layer having a depth D. Subsequently, the cutting segment 70, which is located in a direction behind the direction of feed indicated by arrow 20 from the compressing segment 60, will cut the compressed portion B to a depth less than that of the non-porous layer D, thereby retaining at least a portion of the non-porous surface layer. Since the cutting segment 70 is used to improve the surface finish of the workpiece, the cutting segment 70 may assume any of a number of different geometries intended to provide acceptable surface finishes.

As previously mentioned, when the material is compressed by the compressing segment 60, plastic deformation occurs at the surface and elastic deformation occurs beyond that. It is possible, under certain circumstances, for the cutting edge 72 of the cutting segment 70 to be collinear with the blunt edge 65 of the compressing segment 60 instead of protruding beyond the blunt edge 65 as illustrated in FIGS. 1-3. As an example, if the material in segment B in FIG. 1 was sufficiently compressed, and a significant portion of the deflection was caused by elastic deformation, then when the material is exposed to the cutting segment 70, there will still be elastic compressive energy imparted to the material from the compressing segment 60 which will urge the surface of the material against the cutting segment 70. In that manner, even though the blunt edge 65 and the cutting edge 72 of the cutting segment 70 are collinear, a portion of the non-porous layer will nevertheless be removed.

Returning to FIG. 3, the compressing segment 60 which extends from the top surface 35 to the bottom surface 40 of the tool 25 has a blunt edge 65 formed at the intersection with the top surface 35. The blunt edge 65 has a radius 67 which may be produced by honing methods which are well-known by those skilled in the art of manufacturing cutting tools. When viewed looking down from the top surface 35, the blunt edge 65 has a straight profile. In order to maximize the efficiency of the compressing segment 60, the compressing segment 60 should have clearances relative to the workpiece 10 (FIG. 1). The compressing segment 60 has a compressing segment side clearance angle, CPS, which is measured from a vertical line perpendicular to the top surface 35 and the face of the compressing segment 60 and may be between 0–15°. Furthermore, the compressing segment 60 has a compressing segment top clearance angle, CPT, which is measured from the face of the compressing segment 60 to a line parallel to the direction of feed 20 and may be between 0–15°.

Just as the compressing segment 60 should have clearance relative to the workpiece 10, so should the cutting segment 70. As illustrated in FIG. 3, the cutting segment 70 has a cutting segment side clearance angle, CTS, which is measured from a vertical line perpendicular to the top surface 35 to the face of the cutting segment 70 and may be between 0–15°. Furthermore, the cutting segment 70 has a cutting segment top clearance angle, CTT, which is measured from the face of the cutting segment 70 to a line parallel to the direction of feed 20 and may be between 0–15°.

It should furthermore be appreciated that cutting segment 70, unlike the compressing segment 60, does not have a radius 67 but has a cutting edge 72, which preferably is sharp to promote cutting.

The clearance segment 75, which is adjacent to the cutting segment 70, must be recessed sufficiently to avoid contact with the workpiece 10 and to minimize contact with any machined chips that will be produced as a result of the cutting operation.

Figure 4:
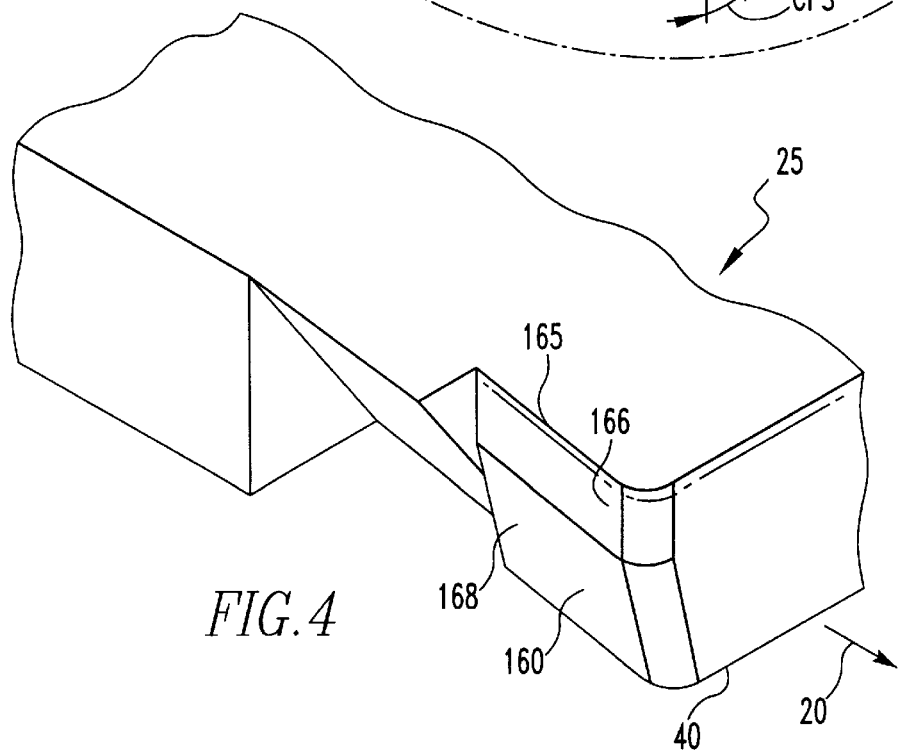
FIG. 4 illustrates an isometric view of a cutting tool corner portion in accordance with a second embodiment of the present invention.

In a second embodiment of the subject invention illustrated in FIG. 4, the compressing segment 160 has a blunt edge 165 that extends across a flat band 166 positioned adjacent flank 168 which intersects with the bottom surface 40 of the cutting tool 25. In this fashion, the blunt edge 165 receives additional structural support from the flat band 166 while also permitting flank 168 to be angled for clearance. While both the flat band 166 and the flank 168 may have side clearance angles and top clearance angles similar to those illustrated in FIG. 3, the design in FIG. 4 permits the flank 168 to have a greater side clearance angle than the flat band 166. The other features of this embodiment are identical to those discussed with the first embodiment in FIGS. 1–3.

Figure 5:
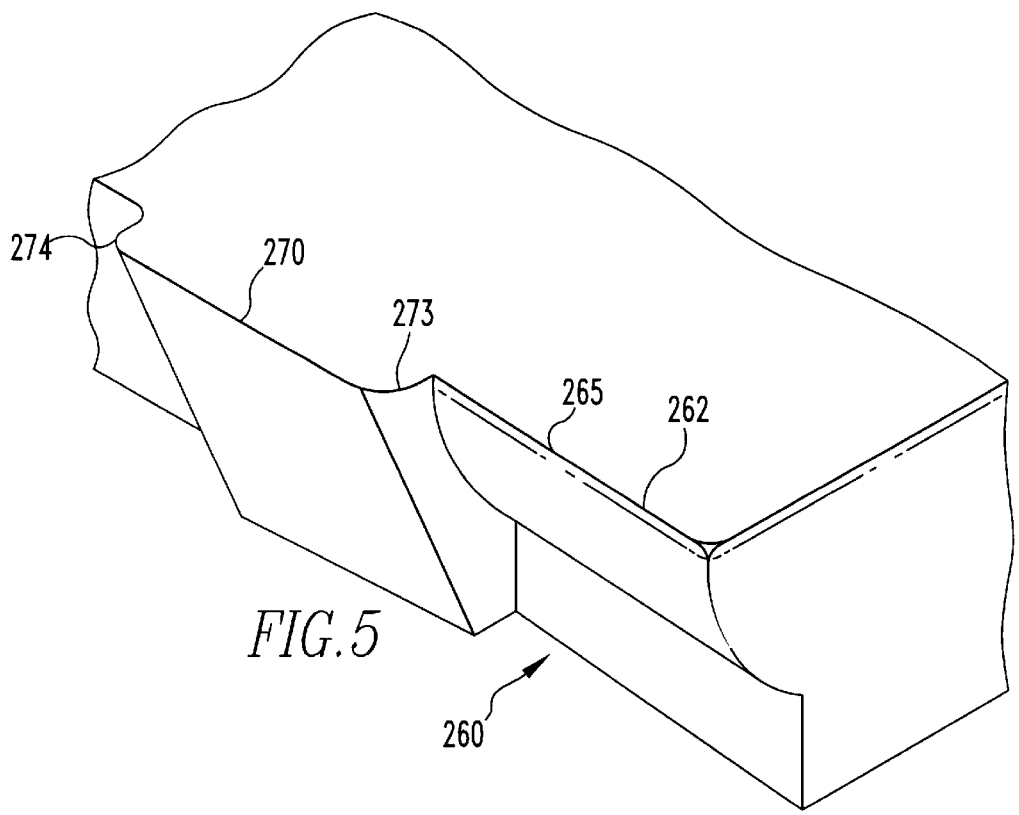
FIG. 5 illustrates an isometric view of a cutting tool corner portion in accordance with a third embodiment of the present invention.

FIG. 5 illustrates a third embodiment of the subject invention by which the compressing segment 260 comprises a curved periphery surface 262 which provides additional structural support to the blunt edge 265 in a similar fashion to that of flank 168 in FIG. 4. This embodiment again is identical to that illustrated in FIGS. 1–3 with the exception of the compressing segment 260 with the curved periphery surface 262 and additional curved surfaces 273, 274 on the edges of the cutting segment 270. It should be pointed out that, unless required to enhance cutting, sharp corners are not desirable because they not only are prone to chipping but, additionally, act as areas in which stress may concentrate, thereby resulting in breakage. For that reason, the cutting edge 270 has corners 273 and 274 which are curved.

Figure 6:
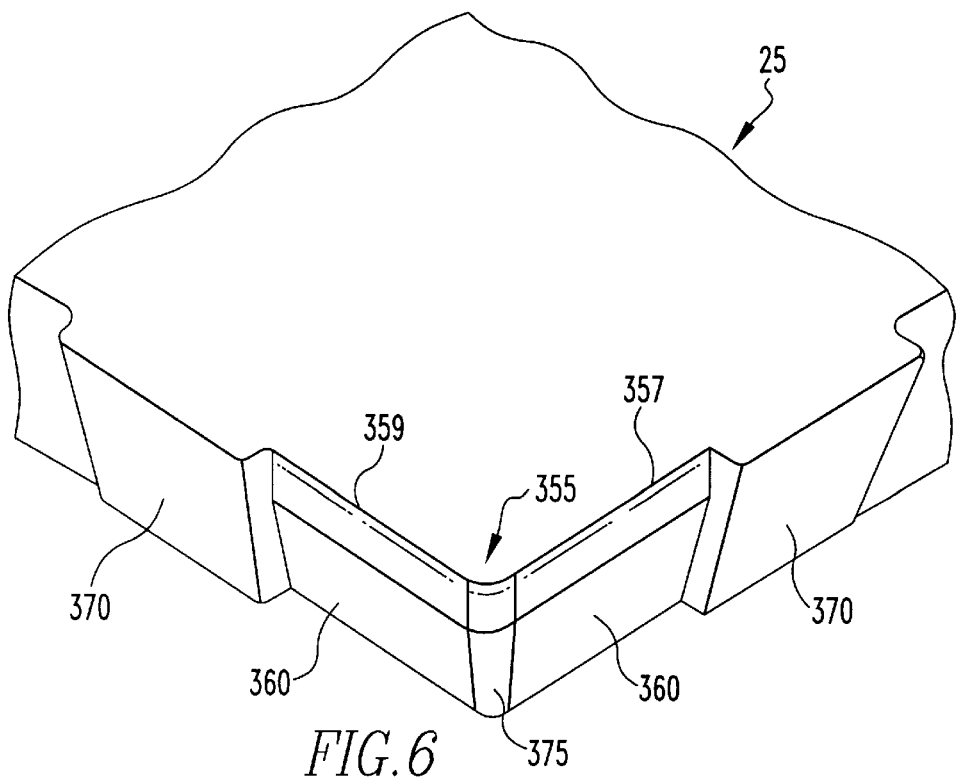
FIG. 6 illustrates an isometric view of a cutting tool corner portion in accordance with a fourth embodiment of the present invention.

The arrangements so far discussed in FIGS. 1–5 illustrate a compressing segment adjacent a cutting segment on a single side of an insert. In a fourth embodiment shown in FIG. 6, a tool 25 has a corner region 355 in which both sides 357 and 359 have a compressing segment 360 and a cutting segment 370. Under these circumstances, the two compressing segments 360 may be blended to provide a smooth corner 375. Although the corner region 355 has compressing segments 360 and cutting segments 370 which are similar to those illustrated in the second embodiment of the invention, which is illustrated in FIG. 4, it should be appreciated that this arrangement may be easily modified to include any of the embodiments discussed herein.

Figure 7:
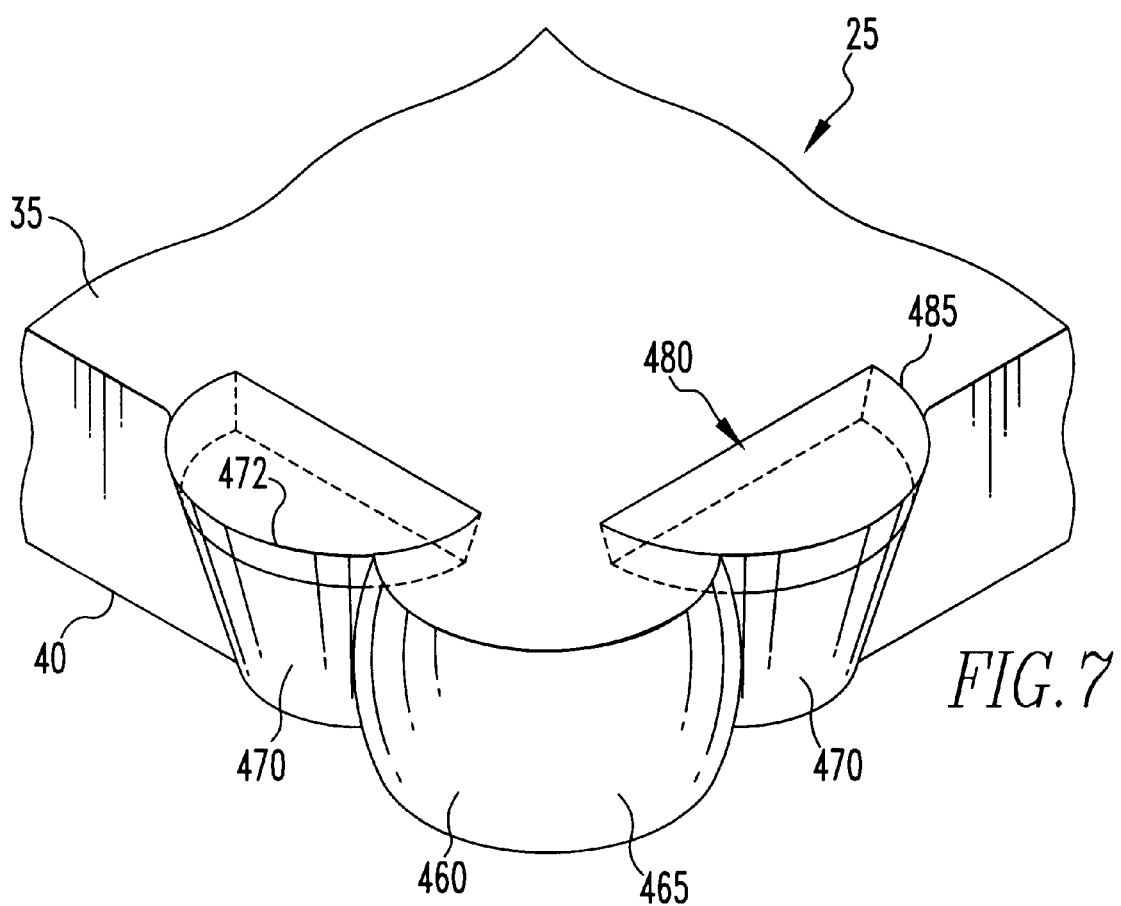
FIG. 7 illustrates an isometric view of a cutting tool corner portion in accordance with a fifth embodiment of the present invention.

FIG. 7 illustrates a fifth embodiment of the subject invention by which the compressing segment 460 has a curved profile when looking down on the top surface 35. The compressing segment 460 is illustrated with a curved periphery surface 465 between the top surface 35 and the bottom surface 40 of the tool 25. However, it should be appreciated that, even though there is a curved profile when looking down on the top surface 35, the compressing segment 460 may have cylinder-type walls or may be tapered in a conical arrangement. It is also possible to have cylinder-type walls on one part of the compressing segment 460 and conical walls in the other part of the compressing segment 460 in a fashion similar to the corner region 375 in FIG. 6.

The cutting segment 470 may also have a curved profile when looking down upon the top surface 35, as shown again in FIG. 7. However, just as with the previous embodiments, the cutting segment 470 has a cutting edge 472 which preferably is sharp to promote cutting of the workpiece.

The cutting tool 25 may be made of any number of materials used for metalworking, including coated and uncoated substrates made of cemented carbides, cermets, monolithic and composite ceramics, polycrystalline cubic boron nitride and polycrystalline diamond. Substrates may be coated using chemical vapor deposition (CVD), physical vapor deposition (PVD), or a combination thereof. One such coating that may be applied to cemented carbide is a diamond film.

Since the compressing segment 460 is used to impart compressive forces to the workpiece 10 while the cutting segment 470 is used to shear material from the workpiece through the cutting edge 472, it is possible to provide on the cutting tool 25 two different materials to best accommodate the requirements of the compressing segment 460 and the cutting segment 470. As illustrated in FIG. 7, the entire tool may be made of the same material, while alternatively an inlaid portion 480 of a material more suitable for cutting may be positioned within a pocket 485 in the tool 25 such that the material of the cutting tool 25 is most suitable to satisfy the requirements of the compressing segment 460 while the inlaid portion 480 is of a material most suitable to satisfy the requirements for the cutting segment 470. This arrangement may be alternated such that the inlaid portion exists in the compressing segment 460 and the cutting tool 25 is comprised of a material suitable for the cutting segment 470. Furthermore, both cutting segments 470 may utilize inlaid portions 480. When the cutting segments 470 and the compressing segment 460 are all inlaid portions, then the cutting tool may have a substrate suitable for holding the inlaid portions without requiring the substrate be designed to compress or cut material.

Mounting and securing the inlaid portion 480 within the pocket 485 of the tool 25 may be done by brazing the inlaid portion 480 within the pocket 485 or by securing the tool 25 within the pocket 485 using any other techniques known by those skilled in the art of insert fabrication.

Throughout the text, reference has been made to the compressing segment with a blunt edge. An edge having a radius of between 0.030 and 0.500 inches may be considered blunt. The purpose of the edge is to compress the material of the workpiece, as opposed to cutting the material. For that reason, also, the penetration of the blunt edge against the workpiece may not exceed the radius of the blunt edge because a flat portion of the tool would then engage the workpiece, resulting in cutting. Stated differently, the blunt edge must engage the workpiece.

Throughout the text, reference has also been made to the cutting segment with a cutting edge that is preferably sharp. A sharp cutting edge may have a radius of up to 0.001 inches which typically is produced by grinding and/or a honing operation. When the cutting edge is made of a diamond material, such as cemented carbide with a thin film diamond coating, then the edge may be as sharp as possible and no honing is required.

The general operation of the cutting tool 25 in accordance with the present invention involves introducing the cutting tool 25 to a workpiece 10 which is rotating about a centerline 15 in a conventional fashion and with conventional hardware currently available in industry. The cutting tool 25 is pushed against the workpiece a distance d1 illustrated in FIG. 1 so that the compressing segment 60 imparts a compressive force to the workpiece 10, thereby producing a category of compressed material represented by dots 90 with a density greater than that of the density of the remaining workpiece illustrated by the dots 85. The difference in density is illustrated in segment B. This produces a nonporous surface layer that penetrates the workpiece to a depth D. However, the density of this material decreases with distance away from the surface and, therefore, it is necessary to compress the material sufficiently so that any portion of the surface layer removed through a cutting operation will expose a portion of the workpiece still having a non-porous surface. Therefore, the cutting segment 70 has a depth of cut d2 which, although it is greater than the distance d1, does not remove the entire depth of the material for which a non-porous surface is available. The purpose of cutting the workpiece with cutting segment 70 is to improve the surface finish, and for that reason it may be necessary to remove only a thin layer of material.

FIG. 1 illustrates a compressing segment 60 of a certain length and a cutting segment 70 of another length. To receive the benefit of the subject invention, the feed rate in the direction of feed 20 must be low enough, or the segments long enough, so that each point on the workpiece is contacted by both the blunt edge 65 of the compressing segment 60 and the cutting edge 72 of the cutting segment 70. For those segments that are angled to provide a clearance angle or angles, it is important that the feed rate or the width between the blunt edge 65 of the cutting segment 70 which contacts the workpiece 10 and the cutting edge 72 of the cutting segment 70 which contacts the workpiece 10 be suitable so that each contact all points on the workpiece 10.

The discussion so far has been directed to a stationary cutting tool with a rotating workpiece. It should be appreciated that the tool of the subject invention may also be used on a rotating tool such as an indexable drill or a milling cutter in which the workpiece is stationary and the tool is moving. As an example, using an indexable drill, a non-porous surface layer may be imparted to the bore of a hole in a workpiece such that the workpiece is more suitable to act as a passageway for fluids, which may be coolant or lubricants in an engine block.

While the embodiment described herein has been directed to machining the outside diameter of a workpiece, it should be appreciated the cutting tool and method herein could be applied to machining the inside diameter of a workpiece or to any other metalworking operation involving the progressive advancement of the cutting insert across a workpiece.

What has been described is a cutting tool used to produce a non-porous surface layer and to subsequently provide a desired finish to the non-porous surface layer by compressing the material and then removing only a portion of the compressed material to produce a non-porous surface layer with a desired finish. A method for accomplishing this has also been described.

The present invention may, of course, be carried out in other specific ways than those herein set forth without departing from the spirit and essential characteristics of the invention. The present embodiments are therefore to be considered in all respects as illustrative and not restrictive, and all changes coming within the meaning and equivalency range of the appended claims are intended to be embraced therein.

What is claimed is:

1. A cutting tool for sealing the surface of a porous workpiece and for removing material from the workpiece along a direction of feed of the cutting tool, wherein the cutting tool has a polygonal body of wear resistant material and comprises:
   (a) top and bottom surfaces and a peripheral wall therebetween; and
   (b) at least one corner region comprised of:
      (i) a compressing segment having a blunt edge defined at the intersection of the compressing segment with the top surface for imparting a force which is predominantly compressive upon a portion of the workpiece and producing on that compressed portion a non-porous surface layer having a depth; and
      (ii) a cutting segment located in a direction opposite the direction of feed from the compressing segment having an edge which protrudes at least to a blunt contact surface of the compressing segment for cutting the compressed portion to a depth less than that of the non-porous layer thereby retaining at least a portion of the non-porous surface layer.

2. The cutting tool according to claim 1 wherein the blunt edge has a straight profile when viewed looking down on the top surface.

3. The cutting tool according to claim 2 wherein the blunt edge is defined at the intersection of the compressing segment with the top surface and wherein the blunt edge has a radiused profile.

4. The cutting tool according to claim 3 wherein the compressing segment is flat and extends from the top surface of the tool toward a bottom of the tool.

5. The cutting tool according to claim 4 wherein the compressing segment forms a side clearance angle of between 0–15° with a vertical line perpendicular to the top surface and wherein the compressing segment forms a top clearance angle with a line parallel to the direction of feed of between 0–15°.

6. The cutting tool according to claim 4 wherein the cutting segment forms a side clearance angle of between 0–15° with a vertical line perpendicular to the top surface and wherein the cutting segment forms a top clearance angle of between 0–15° with a line parallel to the direction of feed.

7. The cutting tool according to claim 3 wherein the compressing segment forms a curved periphery between the top surface and the bottom surface of the tool.

8. The cutting tool according to claim 7 wherein the cutting segment forms a side clearance angle of between 0–15° with a vertical line perpendicular to the top surface and wherein the cutting segment forms a top clearance angle of between 0–15° with a line parallel to the direction of feed.

9. The cutting tool according to claim 1 wherein the compressing segment forms a side clearance angle of between 0–15° with a vertical line perpendicular to the top surface and wherein the compressing segment forms a top clearance angle of between 0–15° with a line parallel to the direction of feed.

10. The cutting tool according to claim 1 wherein the blunt edge has a curved profile when viewed looking down on the top surface.

11. The cutting tool according to claim 10 wherein the blunt edge is defined at the intersection of the compressing segment with the top surface and wherein the blunt edge has a radiused profile.

12. The cutting tool according to claim 11 wherein the compressing segment has a flat periphery between the top surface and the bottom surface of the tool.

13. The cutting tool according to claim 12 wherein the compressing segment forms a side clearance angle of between 0–15° with a vertical line perpendicular to the top surface.

14. The cutting tool according to claim 11 wherein the compressing segment has a curved periphery between the top surface and the bottom surface of the tool.

15. The cutting tool according to claim 1 wherein the cutting segment has a straight profile when viewed looking down on the top surface.

16. The cutting tool according to claim 15 wherein the cutting segment forms a side clearance angle with a vertical line perpendicular to the top surface of between 0–15° and wherein the cutting segment forms a top clearance angle with a line parallel to the direction of feed of between 0–15°.

17. The cutting tool according to claim 1 wherein the cutting segment has a curved profile when viewed looking down on the top surface.

18. The cutting tool according to claim 1 wherein the cutting segment forms a side clearance angle with a vertical line perpendicular to the top surface of between 0–15° and wherein the cutting segment forms a top clearance angle with a line parallel to the direction of feed of between 0–15°.

19. The cutting tool according to claim 1 wherein the compressing segment is cemented carbide and the cutting segment is comprised of a separate material suitable for cutting which is mounted to a cemented carbide substrate.

20. The cutting tool according to claim 19 wherein the separate material comprises polycrystalline diamond.

21. The cutting tool according to claim 19 wherein the separate material comprises cemented carbide.

* * * * *